Feb. 24, 1959 — W. A. WEYL — 2,875,086
CERAMIC PIGMENT
Filed Dec. 13, 1956 — 3 Sheets-Sheet 1

FIG. I

WOLDEMAR A. WEYL  *INVENTOR.*

WOLDEMAR A. WEYL  INVENTOR.

United States Patent Office 2,875,086
Patented Feb. 24, 1959

2,875,086

CERAMIC PIGMENT

Woldemar A. Weyl, State College, Pa., assignor to The Harshaw Chemical Company, Cleveland, Ohio, a corporation of Ohio Application December 13, 1956, Serial No. 628,071

10 Claims. (Cl. 106—299)

This invention relates to pigments, and more particularly to vanadium-zirconium ceramic pigments containing a minor proportion, not more than about 5% of indium and/or yttrium oxide by weight. This application is a continuation-in-part of a copending application bearing Serial Number 575,429, entitled Vanadium-Zirconium-Indium Yellow and filed April 2, 1956 (now abandoned).

Prior to the present invention, yellow pigments have been made which essentially consist of the oxides of zirconium and vanadium, and these have been proved to have commercial value. However, they are characterized by a greenish cast, and so far as I am aware, no one has, prior to the present invention suggested the incorporation of indium oxide or yttrium oxide in such pigment.

It has been discovered in accordance with the present invention that vanadium-zirconium yellow ceramic pigments tending to richer, stronger and cleaner yellow color can be produced by the incorporation therein of small proportions of indium oxide or yttrium oxide or a mixture thereof.

Accordingly, an object of the invention is to provide new and improved yellow zirconium-vanadium ceramic pigments containing an oxide of indium and/or yttrium in small proportions preferably not exceeding about 5% by weight and a process for producing the same. More specifically, an object of the invention is to provide zirconium-vanadium yellow ceramic pigments, the color of which is lower in the wavelength below about 600 millimicrons and higher in wavelengths above about 600 millimicrons than presently known zirconium-vanadium yellow pigments.

With these and other more limited objects in view, the invention consists in the novel features of composition and production herein disclosed and encompassed within the scope of appended claims.

Figure 1:
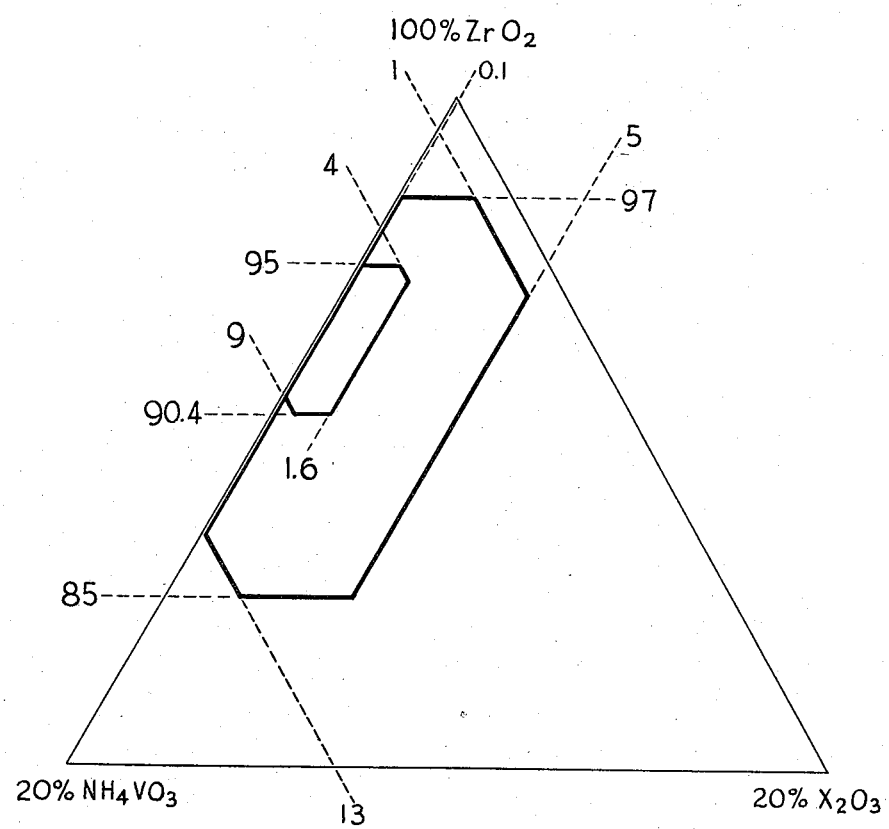

Fig. 1 is a triaxial diagram indicating the proportion ranges of the essential components wherein X stands for either indium or yttrium.

Figure 2:
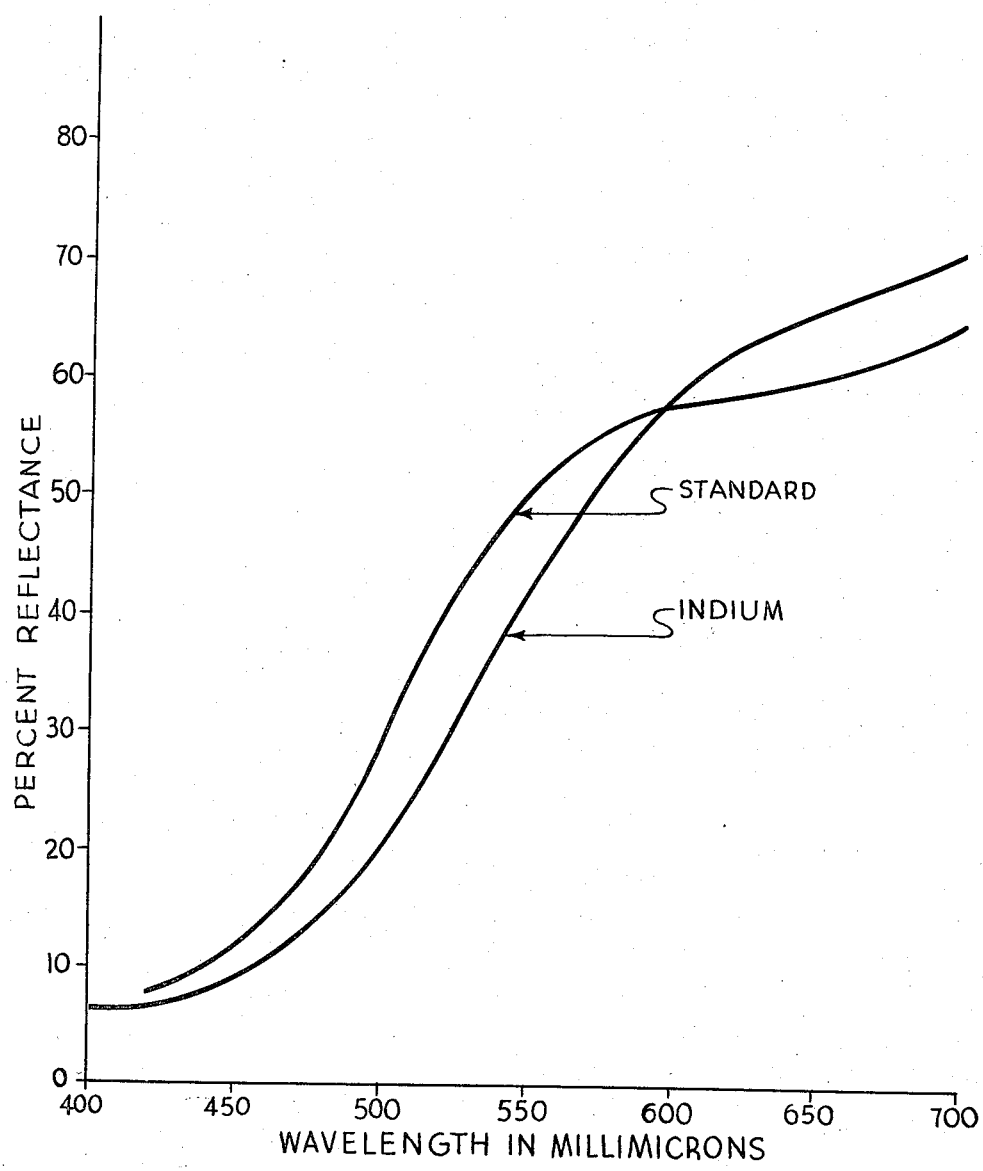

Fig. 2 is a diagrammatic comparison of a standard vanadium-zirconium yellow with an indium containing vanadium-zirconium yellow, the curved lines on the drawing being approximate copies of spectrophotometer tracings produced from tiles in which the pigments were employed in glazes. The zirconium oxide utilized in the compounding of the pigments illustrated in Fig. 2 was a commercial grade zirconium oxide customarily employed in the compounding of known vanadium-zirconium yellows.

Figure 3:
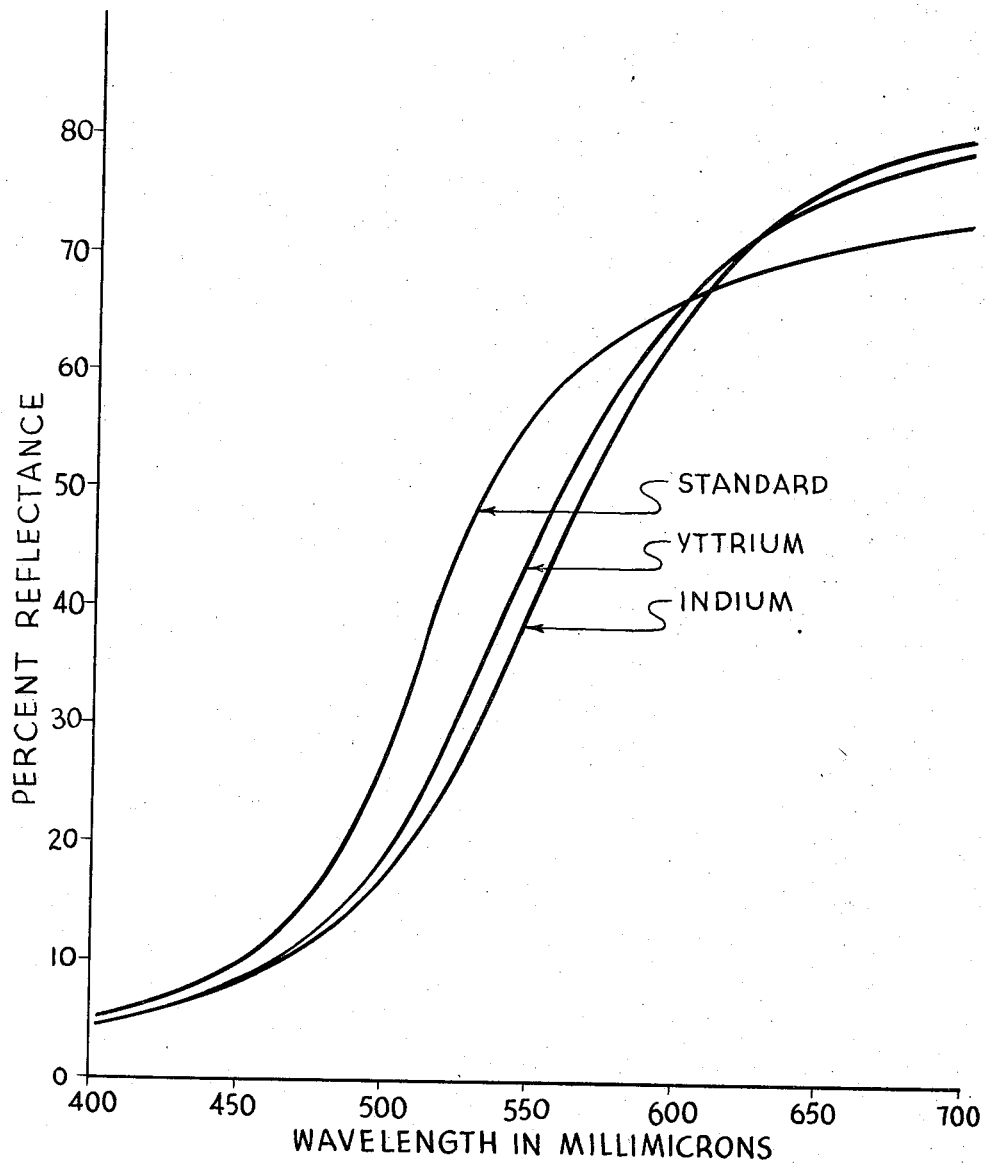

Fig. 3 is a diagrammatic comparison of a standard vanadium-zirconium yellow with an indium-containing vanadium-zirconium yellow and an yttrium-containing vanadium-zirconium yellow, the curved lines on the drawing being approximate copies of spectrophotometer tracings produced from tiles in which the pigments were employed in glazes. The pigments illustrated in Fig. 3 were compounded from a zirconium oxide which is of high purity.

The formation of color centers and pigments of the type described above is not yet fully understood. I associate the yellow color with vanadium in the quantum state $V^{5+}$. In order to produce the maximum amount of this pentavalent vanadium within a host lattice such as that of zirconium dioxide, an element should be introduced which preferably assumes the quantum state $M^{3+}$. Such a combination as $V^{5+}$ $M^{3+}$ can take the place of $Zr^{4+}$ ions. In order to do so a further requirement is the proper size of the element and its electron configuration. Based upon the above considerations, $In^{3+}$ and $Y^{3+}$ ions are considered to be the most suitable to bring a maximum number of $V^{5+}$ ions into the structure of the host lattice. Thus the greenish color of the early pigment which I attribute to $V^{3+}$ ion can be suppressed and a purer orange yellow can be attained.

In the preferred embodiment of the invention the proportions of ingredients which are mixed together and calcined, are as follows:

| | Percent by weight |
|---|---|
| $ZrO_2$ | 85 to 97 |
| $In_2O_3$ or $Y_2O_3$ | 0.1 to 5 |
| $NH_4VO_3$ | 1 to 13 |

These limits in terms of approximate theoretical composition of pigment would be as follows:

| | Percent by weight |
|---|---|
| $ZrO_2$ | 85 to 97 |
| $In_2O_3$ or $Y_2O_3$ | 0.1 to 5 |
| $V_2O_5$ | 0.78 to 10.1 |

It will be understood that the ultimate oxides produced upon calcination are $ZrO_2$, $V_2O_5$ and $In_2O_3$ or $Y_2O_3$ or a mixture thereof as the case may be. Other compounds capable of yielding these oxides on calcination may be used in equivalent proportion. It will be apparent that indium oxide may be employed alone or in combination with yttrium oxide, although indium oxide according to the invention has a more pronounced effect in producing a pigment the color of which exhibits a reflectance lower in the wavelengths below about 600 millimicrons and higher in wavelengths above about 600 millimicrons than conventional yellow pigments of the zirconium-vanadium type.

It will be clear from the drawings (Fig. 1) that the range of composition is a small part of the total range of possible compositions of the three ingredients, only a small portion of the total composition diagram being shown, $ZrO_2$ being the principal component of the finished pigment, $V_2O_5$ being a minor component and $X_2O_3$, wherein X represents either In or Y, being present in quite low proportions. Any quantity of indium or yttrium above a trace, preferably at least 0.1% by weight, is beneficial in proportion to the quantity employed up to about 1% of $X_2O_3$, at which point it ceases to improve but remains beneficial up to about 4.0 or even 5.0% of $In_2O_3$ or $Y_2O_3$ where the color is still superior but less strong and clean than at 1.0% $X_2O_3$. Furthermore, quantities of indium oxide or yttrium oxide above about 1% by weight are not much if at all superior to quantities in the order of 0.8 to 1.0%. Thus, while quantities in the above indicated range of indium oxide or yttrium oxide or equivalent quantities of compounds yielding these oxides on calcination can be used successfully and are preferred over quantities outside this range, best results are achieved in the narrow range of 0.1 to 1.6% $X_2O_3$. Approximately identical ranges of yttrium oxide are productive of results parallel with those obtained from the same ranges of indium oxide but less strong and clean as above stated.

While as above indicated ammonium vanadate may be employed in the batch formulation at the rate of from 1 to 13 weight percent, it is better to make use of a narrower range of about 4 to 9 weight percent. The balance of the pigment other than the indium oxide or yttrium oxide and the $V_2O_5$ content would be preferably $ZrO_2$ although it is possible for some impurities to be present in the pigment. Although technical grades of zirconium oxide ($ZrO_2$) may be employed, it is highly desirable to use grades of $ZrO_2$ which are low in free silica. Silica combined as zirconium silicate is tolerated but care should be employed to avoid large proportions of free silica. Although indium shifts the color toward orange yellow even in the presence of free silica as is evident from the color curves set forth in Figs. 2 and Fig. 3, it is best to keep the free silica content of $ZrO_2$ below about 5% based upon the $ZrO_2$ and as low as economically possible since it does to some extent counteract the effects of the indium or yttrium. Preferably impurities in the various raw materials should be low.

A comparison of the curves shown in Fig. 2 with the curves shown in Fig. 3 illustrates the general effect of silica on the resulting color. It will be noted in Fig. 2 wherein an impure $ZrO_2$ was employed in the compounding of the pigment, that in general the pigments are not as high in light reflectance for wavelengths in excess of about 600 millimicrons as in the case with pigments illustrated in Fig. 3. In either case it is evident, however, that the indium and yttrium oxides materially reduce the reflectance of wavelengths below about 600 millimicrons and increase the reflectance of wavelengths above about 600 millimicrons, thereby increasing the intensity of the orange and decreasing the intensity of the green.

The optimum limits in terms of theoretical pigment composition would be as follows:

Percent by weight
$ZrO_2$ ------------------------------ 90.4 to 95
$In_2O_3$ or $Y_2O_3$ ------------------ 0.1 to 1.6
$V_2O_5$ ------------------------------ 3.1 to 7.0

In the manufacture of the pigment, the dry materials in finely divided form may be mixed by stirring or hammer milling or otherwise, and then fired in an atmosphere from strongly oxidizing to moderately reducing. It is preferred to make use of an atmosphere which is neutral to weakly reducing. For example, firing in air gives a slightly less desirable result than in the case where the furnace is gas fired and the pigment is calcined in contact with the products of combustion.

The calcination temperature should be at least 1050° C. and preferably may be from 1050° C. to 1375° C. or even as high as 1500° C. The color becomes cleaner and stronger as the calcination temperature is increased.

Pigments prepared as above indicated develop their desirable rich color characteristics when applied in glaze as a glaze stain. If, however, the calcination is only 900° C. to 950° C. the pigment yields an almost colorless fused glaze.

Examples of compounds suitable for use in the process are zirconium compounds of the class consisting of $ZrO_2$, $ZrOCl_2$, $Zr(SO_4)_2$, $ZrF_4$, $Zr(NO_3)_4$, indium and yttrium compounds of the class consisting of $In_2O_3$, $Y_2O_3$, $In(NO_3)_3$, $Y(NO_3)_3$, $In_2(SO_4)_3$, $Y_2(SO_4)_3$, and vanadium compounds of the class consisting of $NH_4VO_3$, $V_2O_5$, and $HVO_3$.

The following specific batch compositions set forth in Table I will serve to illustrate the invention with respect to the incorporation of indium oxide. All were calcined in a gas fired furnace in a temperature range from about 1250° C. to 1375° C. the pigment batch was brought to within this range in about 5 to 7 hours, held there for 3 to 5 hours and then allowed to cool to room temperature.

TABLE I

V—Zr—In yellow composition variations

| | $ZrO_2$* | $NH_4VO_3$ | $In_2O_3$ | Remarks |
|---|---|---|---|---|
| (1) | 95 | 5 | | Strong greenish yellow. |
| (2) | 99.15 | | 0.85 | No color. |
| (3) | 97.1 | 2.1 | 0.8 | Tan yellow. |
| (4) | 95.14 | 4.05 | 0.81 | Brown yellow. |
| (5) | 91.5 | 7.8 | 0.8 | Increases slightly in strength with increase in $NH_4VO_3$. |
| (6) | 89.3 | 9.6 | 1.1 | Close to (5). |
| (7) | 94.87 | 5.03 | 0.1 | Stronger, less green than (1). |
| (8) | 94 | 5 | 1.0 | Strong orange yellow. |
| (9) | 94.8 | 5.0 | 0.2 | Increases in orange, decreases in green with increase in $In_2O_3$. |
| (10) | 93.4 | 5.0 | 1.6 | Weaker than (8). |
| (11) | 94.2 | 5.0 | 0.8 | Same remark as (9). |
| (12) | 94.2 | 5.0 | 0.8 | Stronger orange yellow than (11). |

*The zirconium oxide raw material employed for compositions numbered 1 through 11 inclusive, contained about 3.8% $SiO_2$ as an impurity whereas for item 12 the raw material contained practically no $SiO_2$ as an impurity.

The following specific batch compositions shown in Table II serve to illustrate the invention with respect to the yttrium containing pigments. All were calcined in a gas furnace in a temperature range from about 1250° C. to about 1375° C. and in substantially the same manner as indicated for the pigments set forth in Table I.

TABLE II

V—Zr—Y yellow composition variations

| | $ZrO_2$* | $NH_4VO_3$ | $Y_2O_3$ | Remarks |
|---|---|---|---|---|
| (1) | 94.5 | 5.0 | 0.5 | Light orange yellow. |
| (2) | 94.0 | 5.0 | 1.0 | Stronger orange yellow than (1). |
| (3) | 93.0 | 5.0 | 2.0 | Between (1) and (2). |
| (4) | 94.2 | 5.0 | 0.8 | Stronger orange yellow than (1), (2) or (3). |
| (5) | 95 | 5.0 | | Greenish yellow. |

*The zirconium oxide raw material employed for compositions numbered 1 through 3 inclusive contained about 3.8% $SiO_2$ as an impurity whereas for compositions numbered 4 and 5 the raw material contained practically no $SiO_2$ as an impurity.

The curve in Fig. 2 labeled "Standard" corresponds to composition number 1 in Table I. The curve in Fig. 2 labeled "Indium," corresponds to composition number 11 in Table I. The curve labeled "Standard" in Fig. 3 corresponds to composition number 5 in Table II. The curve in Fig. 3 labeled "Indium" corresponds to composition number 12 in Table I, and the curve labeled "Yttrium" in Fig. 3 corresponds to composition number 4 in Table II.

For the preparation of the glazed tiles from which the color curves were obtained, a typical cone 5 lead glaze composition consisting of Percent
Feldspar ------------------------------ 29
$CaCO_3$ (whiting) --------------------- 12
$SiO_2$ -------------------------------- 19
Ball clay ----------------------------- 15
$BaCO_3$ ------------------------------- 6
Lead bisilicate ----------------------- 17
$MgCO_3$ ------------------------------- 2 was first dry blended. The glaze formulation was then pigmented by ball milling 100 parts by weight of the glaze formula with 10 parts by weight of the particular pigment composition. The ball milling was in effect a wet grinding process wherein about 100 cc. of water was utilized per 100 grams of the glazed composition. Grinding was conducted for about 2 hours and the pigment containing glaze utilized was all minus 200 mesh in size. The glaze obtained from the ball mill was sprayed on 2⅛" by 4¼" bisque tile, 7 grams of the wet glaze being utilized on one side of the tile. Thereafter the tile was fired at 1130° C. for three hours.

It will be apparent that either indium oxide or yttrium oxide may be employed in almost identical proportions as indicated heretofore and that preferably indium is used.

I claim:

1. A pigment composition essentially consisting of the calcination reaction product of a zirconium compound, a vanadium compound and a compound of a modifier selected from the class consisting of indium and yttrium and mixtures thereof, said zirconium compound and vanadium compound being such and present in proportions such as to yield on calcination from 85 to 97% by weight of $ZrO_2$ and from 0.78 to 10.1% by weight of $V_2O_5$ respectively and said modifier being such and present in proportions such as to yield on calcination from 0.1 to 5% by weight of compounds selected from the group consisting of $In_2O_3$, $Y_2O_3$, and mixtures thereof, such proportions being in each case based upon the combined weight of zirconium, vanadium and modifier oxides.

2. A pigment composition essentially consisting of the calcination reaction product of a zirconium compound, a vanadium compound and a compound of a modifier selected from the class consisting of indium and yttrium and mixtures thereof, said zirconium compound and vanadium compound being such and present in proportions such as to yield on calcination from 90.4 to 95% by weight of $ZrO_2$ and from 3.1 to 7% by weight of $V_2O_5$ respectively and said modifier being such and present in proportions such as to yield on calcination from 0.1 to 1.6% by weight of compounds selected from the group consisting of $In_2O_3$, $Y_2O_3$, and mixtures thereof, such proportions being in each case based upon the combined weight of zirconium, vanadium and modifier oxides.

3. A process for producing a modified zirconium-vanadium yellow pigment comprising calcining at a temperature in the range from 1050° C. to 1500° C., a mixture essentially consisting of zirconium and vanadium compounds and a modifier selected from the group consisting of compounds of indium and yttrium and mixtures thereof, said compounds of zirconium and vanadium being capable of yielding $ZrO_2$, and $V_2O_5$ respectively on calcination in said temperature range and said modifier being capable of yielding at least one compound selected from the group consisting of $In_2O_3$, $Y_2O_3$, and mixtures thereof on calcination in said temperature range, the modifier and compounds of zirconium and vanadium subjected to calcination being employed in such proportions as are equivalent in production of said oxides to from 85 to 97% by weight of $ZrO_2$, from 1 to 13% by weight of $NH_4VO_3$ and from 0.1 to 5% by weight of a modifier selected from the group consisting of $In_2O_3$, $Y_2O_3$, and mixtures thereof.

4. A process for producing a modified zirconium-vanadium yellow pigment comprising calcining at a temperature in the range from 1050° C. to 1375° C., a mixture essentially consisting of zirconium and vanadium compounds and a modifier selected from the group consisting of compounds of indium and yttrium and mixtures thereof, said compounds of zirconium and vanadium being capable of yielding $ZrO_2$ and $V_2O_5$ respectively on calcination in said temperature range, and said modifier being capable of yielding compounds selected from the group consisting of $In_2O_3$, $Y_2O_3$, and mixtures thereof on calcination in said temperature range, the modifier and compounds of zirconium and vanadium subjected to calcination being employed in such proportions as are equivalent in production of said oxides to from 90.4 to 95% by weight of $ZrO_2$, from 4 to 9% by weight of $NH_4VO_3$ and from 0.1 to 5% by weight of a modifier selected from the group consisting of $In_2O_3$, $Y_2O_3$, and mixtures thereof.

5. A process for producing a modified zirconium-vanadium yellow pigment of improved color characteristics, stronger in the orange and weaker in the green comprising calcining together in a temperature range from 1050° C. to 1500° C. a batch essentially consisting of the following:

| | Percent by weight |
|---|---|
| $ZrO_2$ | 85 to 97 |
| $In_2O_3$ | 0.1 to 5 |
| $NH_4VO_3$ | 1 to 13 |

6. A process for producing a modified zirconium-vanadium yellow pigment of improved color characteristics, stronger in the orange and weaker in the green comprising calcining together in a temperature range from 1050° C. to 1500° C. a batch essentially consisting of the following:

| | Percent by weight |
|---|---|
| $ZrO_2$ | 85 to 97 |
| $Y_2O_3$ | 0.1 to 5 |
| $NH_4VO_3$ | 1 to 13 |

7. A process for producing a modified zirconium-vanadium yellow pigment of improved color characteristics, stronger in the orange and weaker in the green, comprising calcining, at a temperature in the range from 1050° C. to 1500° C., a mixture essentially consisting of zirconium and vanadium compounds and a modifier selected from the group consisting of compounds of indium and yttrium and mixtures thereof, said zirconium compound being selected from the group consisting of $ZrO_2$, $ZrOCl_2$, $Zr(SO_4)_2$, $ZrF_4$, $Zr(NO_3)_4$, said vanadium compound being selected from the group consisting of $NH_4VO_3$, $V_2O_5$, and $HVO_3$, and said modifier being selected from the group consisting of $In_2O_3$, $In(NO_3)_3$, $In(SO_4)_3$, $Y_2O_3$, $Y(NO_3)_3$, and $Y_2(SO_4)_3$, the modifier and compounds of zirconium and vanadium subjected to calcination being employed in such proportions as are capable of yielding on calcination in said temperature range from 85 to 97% by weight of $ZrO_2$, from 0.78 to 10.1% by weight of $V_2O_5$ and from 0.1 to 5% by weight of compounds selected from the group consisting of $In_2O_3$, $Y_2O_3$, and mixtures thereof.

8. A process for producing a modified zirconium-vanadium yellow pigment of improved color characteristics, stronger in the orange and weaker in the green, comprising calcining at a temperature in the range from 1050° C. to 1375° C., a mixture essentially consisting of zirconium and vanadium compounds and a modifier selected from the group consisting of compounds of indium and yttrium and mixtures thereof, said zirconium compounds being selected from the group consisting of $ZrO_2$, $ZrOCl_2$, $Zr(SO_4)_2$, $ZrF_4$, $Zr(NO_3)_4$, said vanadium compound being selected from the group consisting of $NH_4VO_3$, $V_2O_5$, and $HVO_3$, and said modifier being selected from the group consisting of $In_2O_3$, $In(NO_3)_3$, $In(SO_4)_3$, $Y_2O_3$, $Y(NO_3)_3$, and $Y_2(SO_4)_3$, the modifier and compounds of zirconium and vanadium subjected to calcination being employed in such proportions as are capable of yielding on calcination in said temperature range from 90.4 to 95% by weight of $ZrO_2$, from 3.1 to 7% by weight of $V_2O_5$ and from 0.1 to 1.6% by weight of compounds selected from the group consisting of $In_2O_3$, $Y_2O_3$, and mixtures thereof.

9. A vanadium-zirconium yellow pigment essentially consisting of oxides of vanadium and zirconium and a modifier of the class consisting of $In_2O_3$, $Y_2O_3$ and mixtures thereof, said oxides being intimately associated in the form of a heat resistant colored pigment and in proportions ranging from 85 to 97% by weight of $ZrO_2$, from 0.1 to 5% by weight of said modifier, and from 0.78 to 10.1% by weight of $V_2O_5$.

10. A vanadium-zirconium yellow pigment essentially consisting of oxides of vanadium and zirconium and a modifier of the class consisting of $In_2O_3$, $Y_2O_3$, and mixtures thereof, said oxides being intimately associated in the form of a heat resistant colored pigment and in proportions ranging from 90.4 to 95% by weight of $ZrO_2$, from 0.1 to 1.6% by weight of said modifier, and from 3.1 to 7.0% by weight of $V_2O_5$.

References Cited in the file of this patent

UNITED STATES PATENTS 1,945,809    Harbert ---------------- Feb. 6, 1934

FOREIGN PATENTS 384,473    Great Britain ------------ Dec. 8, 1932
625,448    Great Britain ------------ June 28, 1949

OTHER REFERENCES

Article on "Indium Glass," by Wm. S. Murray, on pp. 903–904 of the Industrial and Engineering Chemistry, August 1934. A print in Class 106, Subclass 288.